(12) United States Patent
Yano et al.

(10) Patent No.: US 12,542,179 B2
(45) Date of Patent: Feb. 3, 2026

(54) FLASH MEMORY AND WEAR LEVELING METHOD THEREOF

(71) Applicant: Winbond Electronics Corp., Taichung (TW)

(72) Inventors: Masaru Yano, Kanagawa (JP); Masato Ono, Kanagawa (JP); Takehiro Kaminaga, Kanagawa (JP)

(73) Assignee: Winbond Electronics Corp., Taichung (TW)

( * ) Notice: Subject to any disclaimer, the term of this patent is extended or adjusted under 35 U.S.C. 154(b) by 231 days.

(21) Appl. No.: 18/429,450

(22) Filed: Feb. 1, 2024

(65) Prior Publication Data

US 2024/0265964 A1    Aug. 8, 2024

(30) Foreign Application Priority Data

Feb. 2, 2023   (JP) .................................. 2023-014436

(51) Int. Cl.
*G11C 11/56*        (2006.01)
(52) U.S. Cl.
CPC .................................. *G11C 11/56* (2013.01)
(58) Field of Classification Search
CPC ....... G11C 11/56; G06F 3/0616; G06F 3/064; G06F 3/0679
See application file for complete search history.

(56) References Cited

U.S. PATENT DOCUMENTS

| | | | | |
|---|---|---|---|---|
| 5,920,579 | A * | 7/1999 | Nagai | .................... H04N 5/945 |
| | | | | 714/764 |
| 6,757,800 | B1 * | 6/2004 | Estakhri | ................ G06F 3/0613 |
| | | | | 711/202 |
| 7,747,903 | B2 | 6/2010 | Radke | |
| 2008/0082736 | A1 | 4/2008 | Chow et al. | |
| 2008/0239809 | A1 * | 10/2008 | Chae | ................... G11C 11/5621 |
| | | | | 365/185.09 |

(Continued)

FOREIGN PATENT DOCUMENTS

| | | |
|---|---|---|
| CN | 114089909 | 2/2022 |
| JP | 2014524609 | 9/2014 |

(Continued)

OTHER PUBLICATIONS

"Office Action of Taiwan Counterpart Application", issued on Feb. 11, 2025, p. 1-p. 9.

*Primary Examiner* — Khamdan N. Alrobaie
(74) *Attorney, Agent, or Firm* — JCIPRNET

(57) ABSTRACT

A flash memory that improves the reliability of data stored in a memory cell array is provided in the disclosure. A wear leveling method of the flash memory of the disclosure includes the following operation. The memory cell array includes multiple sectors, the method includes the following operation. A region is set for storing a first flag and a second flag in each sector of multiple sectors of the memory cell array. The first flag indicates whether bit correction has occurred, and the second flag indicates whether specific data is stored. The second flag of a source sector among the sectors in which the specific data is stored is set. The specific data is written to a new sector among the sectors in which the first flag is in a reset state, and the second flag of the new sector is set.

20 Claims, 12 Drawing Sheets

(56) References Cited

U.S. PATENT DOCUMENTS

| | | | | |
|---|---|---|---|---|
| 2009/0235017 A1* | 9/2009 | Estakhri | ............. | G06F 12/0246 |
| | | | | 711/E12.008 |
| 2010/0107021 A1* | 4/2010 | Nagadomi | ........... | G11C 16/349 |
| | | | | 714/704 |
| 2011/0258491 A1* | 10/2011 | Doi | ........................ | G11C 29/56 |
| | | | | 714/45 |
| 2012/0324299 A1 | 12/2012 | Moshayedi | | |
| 2015/0194201 A1* | 7/2015 | Kim | .................... | G11C 29/808 |
| | | | | 714/763 |
| 2024/0134802 A1* | 4/2024 | Laurent | ............... | G06F 12/0888 |

FOREIGN PATENT DOCUMENTS

| | | |
|---|---|---|
| JP | 2017538206 | 12/2017 |
| TW | I764856 | 5/2022 |
| TW | 202238369 | 10/2022 |

* cited by examiner

FIG. 6A Initial state

FIG. 6B Boot data programming

FIG. 6C Source sector determination

FIG. 6D Boot data migration (Bit correction occurred in the boot data of source sector)

FIG. 6E Boot data migration (in response to boot data update command)

FIG. 6F Reading boot data

FIG. 7A

|   | 0 | 1 | 2 | 3 | 4 |
|---|---|---|---|---|---|
| 3 | 01 | 00 | 01 | 11 | 11 |
| 2 | 11 | 00 | 00 | 00 | 01 |
| 1 | 11 | 11 | 01 | 11 | 11 |
| 0 | 01 | 00 | 00 | 00 | 00 |
|   | S/A, W/A | | | | |

Setting ECC flags for all other sectors

FIG. 7B

|   | 0 | 1 | 2 | 3 | 4 |
|---|---|---|---|---|---|
| 3 | 01 | 00 | 01 | 11 | 11 |
| 2 | 11 | 00 | 00 | 00 | 01 |
| 1 | (00) | 01 | 11 | 11 | 11 |
| 0 | 01 | 00 | 00 | 00 | 00 |
|   | S/A, W/A | | | | |

Erasing the oldest sector and resetting the ECC and boot data flags thereof

FIG. 7B1

|   | 0 | 1 | 2 | 3 | 4 |
|---|---|---|---|---|---|
| 3 | 01 | 00 | 01 | 11 | 11 |
| 2 | 11 | 00 | 00 | 00 | 01 |
| 1 | (11) | 01 | 11 | 11 | (11) |
| 0 | 01 | 00 | 00 | 00 | 00 |
|   | S/A, W/A | | | | |

Migrating main data when the erase target sector includes main data before eraing

FIG. 7C

|   | 0 | 1 | 2 | 3 | 4 |
|---|---|---|---|---|---|
| 3 | 01 | 00 | 01 | 11 | 11 |
| 2 | 11 | 00 | 00 | 00 | 01 |
| 1 | (01) | (11) | 11 | 11 | 11 |
| 0 | 01 | 00 | 00 | 00 | 00 |
|   | S/A, W/A | | | | |

Bit correction during reading process

FIG. 7D

|   | 0 | 1 | 2 | 3 | 4 |
|---|---|---|---|---|---|
| 3 | 01 | 00 | 01 | 11 | 11 |
| 2 | 11 | 00 | 00 | 00 | 01 |
| 1 | (00) | 01 | 11 | 11 | 11 |
| 0 | 01 | 00 | 00 | 00 | 00 |
|   | S/A, W/A | | | | |

Erasing the furthest sector and resetting the ECC and boot data flags thereof

FIG. 7E

|   | 0 | 1 | 2 | 3 | 4 |
|---|---|---|---|---|---|
| 3 | 01 | 00 | 01 | 11 | 11 |
| 2 | (01) | 00 | 00 | 00 | 11 |
| 1 | (11) | 11 | 11 | 11 | (11) |
| 0 | 01 | 00 | 00 | 00 | 00 |
|   | S/A, W/A | | | | |

Bit correction during reading process

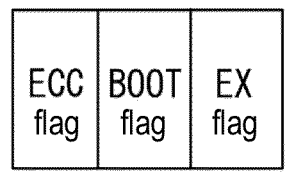
FIG. 11A
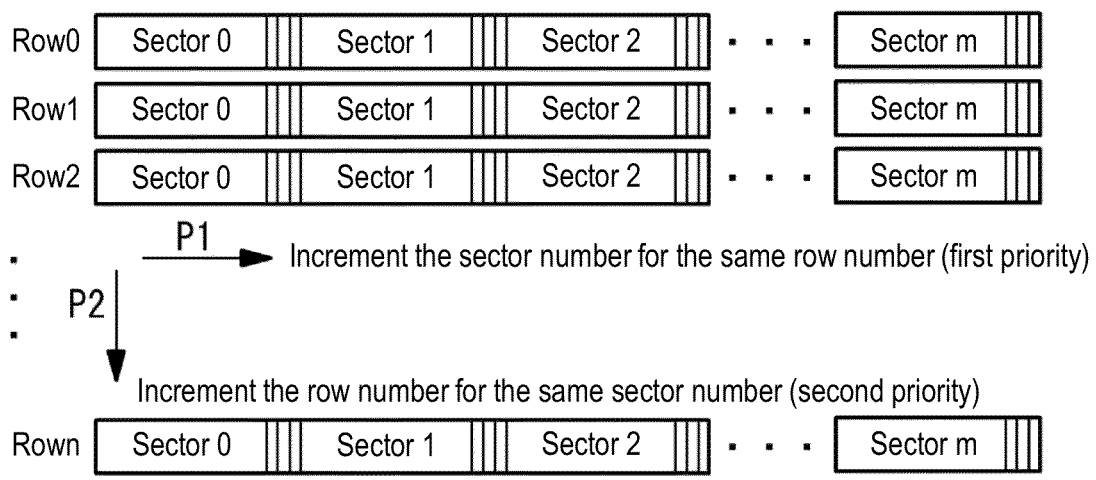
FIG. 11B
(2048 bytes + 3 marks *m)/row
FIG. 11C

FLASH MEMORY AND WEAR LEVELING METHOD THEREOF

CROSS-REFERENCE TO RELATED APPLICATION

This application claims the priority benefit of Japan application serial no. 2023-014436, filed on Feb. 2, 2023. The entirety of the above-mentioned patent application is hereby incorporated by reference herein and made a part of this specification.

BACKGROUND

Technical Field

The disclosure relates to a semiconductor storage device, and in particular relates to a flash memory and a wear leveling method thereof.

Description of Related Art

In NAND/NOR flash memory, when the number of program/erase cycles increases, the transconductance (Gm) deteriorates, eventually leading to a decrease in endurance characteristics (the number of times data may be rewritten) or data retention characteristics. In order to solve this problem, conventional technology proposes wear leveling to equalize the number of rewriting times of memory cells, thereby ensuring their longevity. For example, the host system monitors the usage of specific blocks or sectors and dynamically adjusts the used blocks or sectors so that programming/erasing is not concentrated on specific blocks or sectors, or counts the number of accesses to each block or sector and selects the blocks or sectors to be used in a way that the number of accesses becomes equal (e.g., Japanese patent application No. 2014-524609, Japanese patent application No. 2017-538206).

In the conventional technology, wear leveling is a process utilized by the host system or the controller within the flash memory, which employs counters to count the number of accesses to blocks or sectors. Based on the counting results, the equalization of the number of rewrite times is realized. However, this method requires the incorporation of a counter, making the circuit design complex.

Moreover, even if the number of accesses is equalized, the deterioration status of the memory cells is not actually known according to the number of accesses. Even in blocks or sectors with few accesses, there are cases where the memory cells have deteriorated, the use of such blocks or sectors may cause data errors during reading or programming. In particular, errors must be avoided when reading boot data for system operation. Therefore, a wear leveling method that replaces the conventional monitoring of blocks or sectors based on the number of accesses is desired.

SUMMARY

The disclosure may solve the aforementioned problems, and aims to provide a flash memory and a wear-leveling method thereof to improve the reliability of data stored in a memory cell array.

A wear leveling method of the disclosure is a wear leveling method of a flash memory including a memory cell array. The memory cell array includes multiple sectors, the method includes the following operation. A region is set for storing a first flag and a second flag in each sector of multiple sectors of the memory cell array. The first flag indicates whether bit correction has occurred, and the second flag indicates whether specific data is stored. The second flag of a source sector among the sectors in which the specific data is stored is set. The specific data is written to a new sector among the sectors in which the first flag is in a reset state, and the second flag of the new sector is set.

The flash memory of the disclosure includes a memory cell array and a controller. The memory cell array includes multiple sectors. A region is set for storing a first flag and a second flag in each sector of multiple sectors of the memory cell array. The first flag indicates whether bit correction has occurred, and the second flag indicates whether specific data is stored. The controller is configured to set the second flag of a source sector among the sectors in which the specific data is stored, write the specific data to a new sector among the sectors in which the first flag is in a reset state, and set the second flag of the new sector.

According to the disclosure, when bit correction has occurred during reading of specific data or when specific data is updated, the specific data is migrated to another sector where the first flag is not set, so that the specific data is not stored in the specific region, so the generation of specific data errors may be suppressed and the reliability of the specific data may be improved.

BRIEF DESCRIPTION OF THE DRAWINGS

FIG. 6A to FIG. 6F show a specific example of the wear leveling method according to the first embodiment of the disclosure.

FIG. 7A to FIG. 7E are diagrams showing an example of wear leveling of the first embodiment of the disclosure.

FIG. 11A to FIG. 11C are diagrams illustrating an example of using the ECC flag/boot flag/EX flag of the second embodiment of the disclosure for a sector.

DETAILED DESCRIPTION OF DISCLOSED EMBODIMENTS

The flash memory of the disclosure is, for example, a NAND flash memory, a NOR flash memory, or a microprocessor, microcontroller, logic, application-specific integrated circuit (ASIC), a processor for processing image or sound, a processor for processing wireless signal, etc embedded with such flash memory. In the following description, a NOR flash memory is used as an example.

In a preferred aspect, the flash memory of the disclosure manages the memory cell array through wear leveling, thereby realizing the longevity of the flash memory, and optimizes the storage position of the boot data read from the memory cell array during a boot operation, thereby striving to eliminate errors in the boot data, and enhancing the reliability of the flash memory. Therefore, the present disclosure provides a green semiconductor technology by realizing the longevity and enhancing the reliability of the flash memory.

Figure 1:
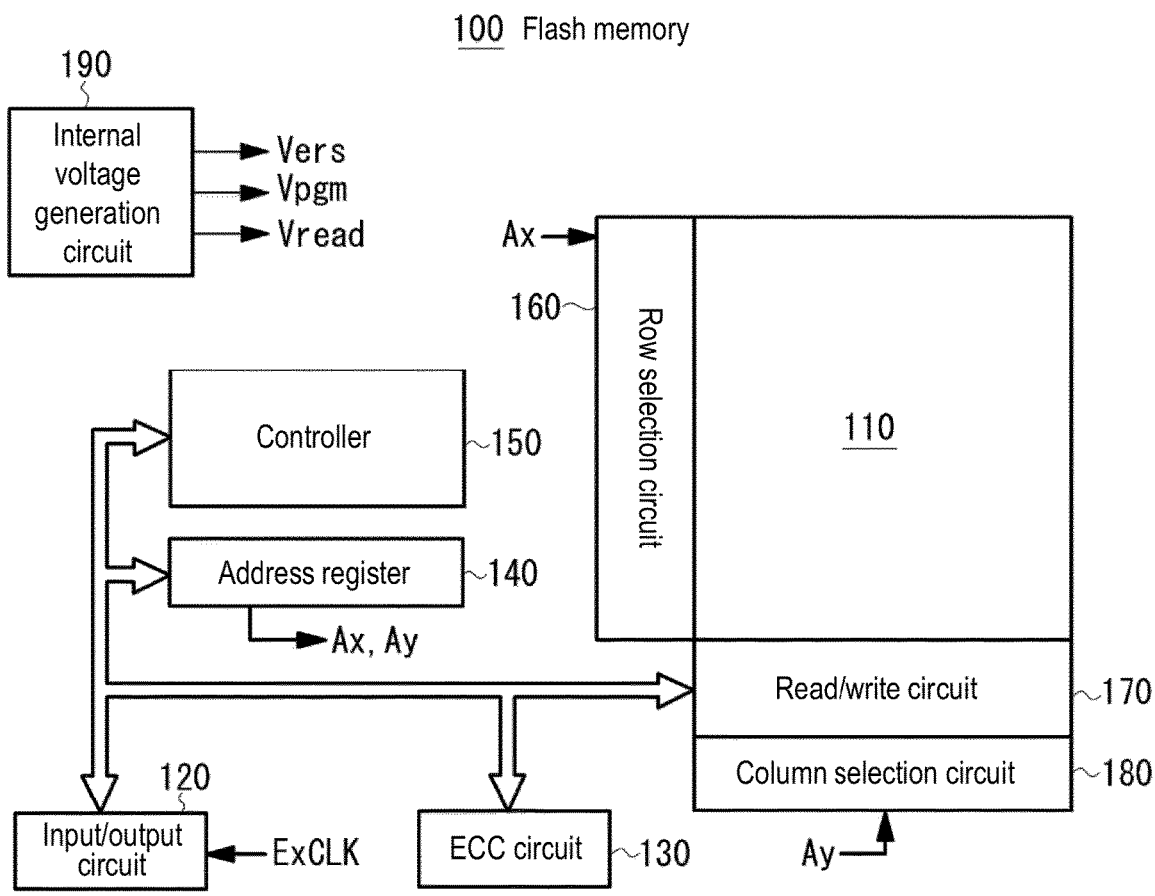
FIG. 1 is a block diagram showing the structure of a flash memory according to an embodiment of the disclosure.

As shown in FIG. 1, a flash memory 100 according to an embodiment of the disclosure may include a memory cell array 110, an input/output circuit 120, an ECC circuit 130, an address register 140, a controller 150, and a row selection circuit 160, a read/write circuit 170, a column selection circuit 180, and internal voltage generation circuit 190. The memory cell array 110 includes multiple memory cells. The input/output circuit 120 is configured to output read data to the outside in synchronization with the clock signal ExCLK, or to import data input from the outside. The ECC circuit 130 is configured to perform code generation of data to be programmed or error detection/correction of read data. The address register 140 is configured to receive address data via the input/output circuit 120. The controller 150 is configured to control every circuits in the flash memory 100 based on command data received via the input/output circuit 120 or control signals applied to the terminals. The row selection circuit 160 is configured to receive the row address information Ax from the address register 140, decode the row address information Ax, and perform word line selection or sector selection based on the decoding result. The read/write circuit 170 is configured to read data from the memory cell selected by the row selection circuit 160 or to write data to be programmed into the selected memory cell. The column selection circuit 180 is configured to receive the column address information Ay from the address register 140, decode the column address information Ay, and perform bit line/source line selection based on the decoding result. The internal voltage generation circuit 190 is configured to generate various voltages (programming voltage Vpgm, read voltage Vread, erase voltage Vers, etc.) required for reading, programming, and erasing of data, etc.

For example, a memory cell includes a charge accumulation layer (e.g., an oxide film-nitride film-oxide film (ONO)) that accumulations charges. The charge accumulation layer includes a conductive gate electrode such as polycrystalline silicon or metal, and the gate electrode is connected to a word line. The memory cell array may be a two-dimensional structure formed on the surface of a substrate such as silicon, or a three-dimensional structure formed vertically from the surface of a substrate. Moreover, the memory cell may be either a single-layer cell (SLC) that stores binary data, or a multi-layer cell (MLC) that stores multi-valued data.

During the reading of the memory cell, a positive voltage is applied to the selection word line through the row selection circuit 160, and the current or voltage between the selection bit line/selection source line is read by the read/write circuit 170. During the programming of the memory cell, the row selection circuit 160 applies a programming voltage to the selection word line, and the read/write circuit 170 applies a voltage corresponding to the data to be programmed to the selection bit line. The hot electrons flowing from the selection bit line to the selection source line are accumulated in the charge accumulation layer. However, the writing method may be other methods, and the charge accumulation layer may trap charges through FN tunneling. The memory cell is erased by applying a voltage to the selection word line, such as injecting hot holes into the charge accumulation layer, or applying an erasure voltage to the substrate so that the charges accumulated in the charge accumulation layer are discharged through FN tunneling. The erasure of memory cells is performed on a sector-by-sector basis, in which the sectors include multiple storage cells, but it may also be performed on a memory cell by memory cell basis. For example, the memory cell array is 256 Mb and the sector size is 4K bytes.

In the flash memory of the first embodiment of the disclosure, each sector of the memory cell array 110 includes a region for storing at least a two-bit flag used in the wear leveling algorithm, in which one is the ECC flag (or the first flag) that indicates whether the bit correction has occurred during the reading of the boot data, and the other is a boot flag (or the second flag) that indicates whether the sector stores boot data. For example, the setting of the ECC flag indicates that the boot data read from the sector has been corrected by the ECC circuit 130, and the setting of the boot flag indicates that boot data is stored in the sector. The memory region storing the two-bit flag assigned to each sector may only be accessed by the controller 150 and cannot be accessed by the user.

Boot data (also referred to boot code) includes data including important programs required for system operation, configuration data or trimming data (e.g., voltage setting for programming or erasing, etc.) to ensure the operation of flash memory, etc. When the system is operating or when the power of the flash memory is turned on, the data is read from the memory cell array and output to the external host system, or provided to the controller 150 in the flash memory. When such boot data disappears or is partially overwritten, it may cause disruptions to system operation or flash memory operation. Therefore, the boot data is data that should be protected as highly reliable data.

Figure 2:
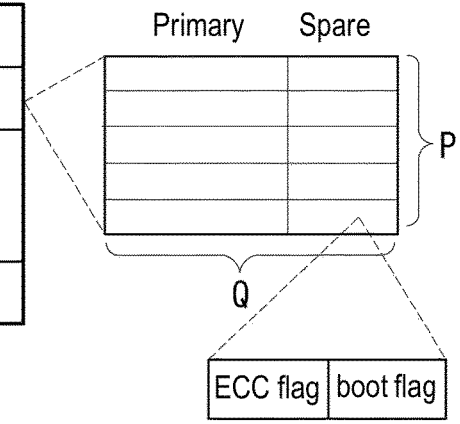
FIG. 2 is a diagram showing the relationship between sectors and ECC (error correcting code) flags/boot flags of the first embodiment of the disclosure.

As shown in FIG. 2, the memory cell array 110 may include multiple sectors arranged in m columns×n rows, and one sector includes multiple memory cells in P columns×Q rows. A sector includes a primary region that is accessible to the user and a spare region that is not accessible to the user. The primary region stores boot data or main data which users can access (use), and the spare region stores attribute information of data written to the primary region. The spare region stores, for example, parity (verification) data or ECC flags/boot flags of data stored in the primary region. In the present embodiment, the ECC flag and the boot flag are not set corresponding to each row, but are set on a sector-by-sector basis, that is, the ECC flag and the boot flag are stored in one sector.

The input/output circuit 120 receives commands, addresses, data, etc. from the host system in synchronization with the clock signal ExCLK, and provides the received commands, addresses, and data to the controller 150, the address register 140, the column selection circuit 180, and the read/write circuit 170. Furthermore, the input/output circuit 120 receives the data read from the memory cell array 110 via the read/write circuit 170 and provides the read data to the host system.

During the programming operation, the ECC circuit 130 encodes the data input via the input/output circuit 120 to generate parity data necessary for error detection and correction of the input data. Although not particularly limited, the ECC circuit 130 generates parity data based on, for example, Hamming code or Reed-Solomon code.

The controller 150 includes hardware and/or software resources, such as a microcontroller or a state machine including read only memory (ROM)/random access memory (RAM). The controller 150 receives commands from the host system and controls overall operations of reading, programming, erasing, etc., based on the commands.

Furthermore, the controller 150 sets/resets the ECC flag and the boot flag according to the usage status of the memory cell array, and performs wear leveling of the boot data stored in each sector with reference to the ECC flag and the boot flag. As a result, the reliability of the boot data is further improved.

Figure 3:
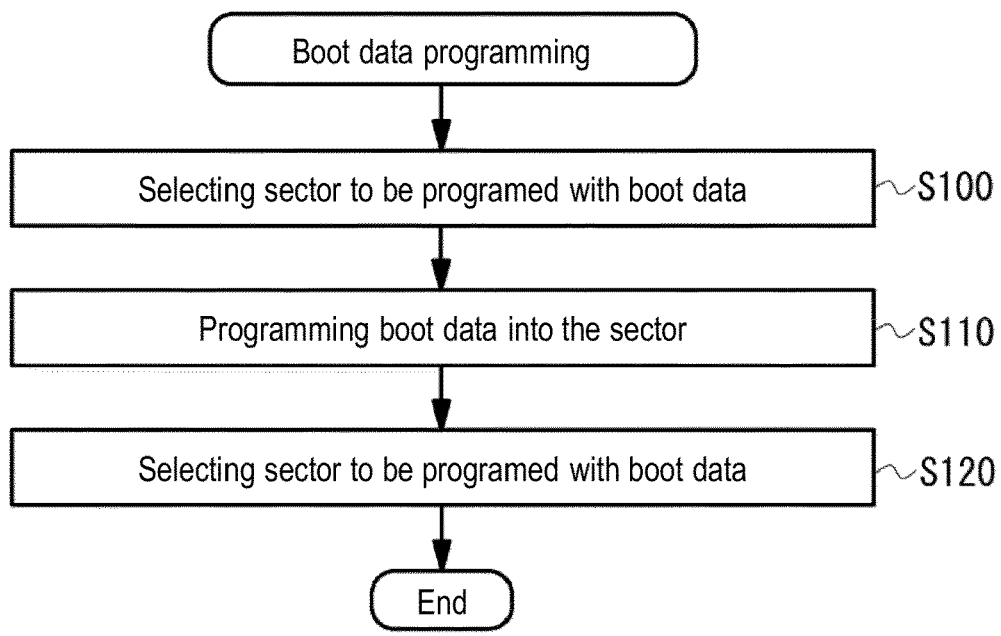
FIG. 3 is a programming method for boot data according to the first embodiment of the disclosure.

Next, the wear leveling method of the boot data of the flash memory in this embodiment is described according to FIG. 3 to FIG. 10. FIG. 3 is a programming method for boot data. When the programming command of the boot data, address, and boot data are received from the host system via the input/output circuit 120, the controller 150 controls the programming of the boot data based on the received command.

The row selection circuit 160 and the column selection circuit 180 select the sector and the memory cell therein to be programed with boot data based on the address from the address register 140 (S100). For example, upon receiving a programming command for boot data, the controller 150 reads the address stored in the ROM and provides the address to the address register 140. The boot data is data that is protected separately from the main data. Therefore, the boot data may also be programmed into a region designated by a specific address. However, in an alternative case where the position for storing boot data has been predetermined, it is not necessarily required to receive an address from the host system.

In this example, when the memory cell array 110 is in a fresh state (the number of programming/erasing cycles is zero) or has just undergone erasing, the data of all memory cells is "1". The ECC flag or boot flag in the spare region of each sector is also "1". Therefore, in the following description, the data "1" is referred to as the reset of the flag, and the data "0" is referred to as the setting of the flag.

Next, the ECC circuit 130 generates parity data of the input boot data, and the controller 150 programs the boot data and parity data into the selected sector (S110). Boot data is programmed into the primary region of the sector, and parity data is programmed into the spare region.

The controller 150 further sets the boot flag of the sector storing boot data (S120). That is, the boot flag in the spare region of the selected sector is programmed into data "0". In the case where boot data is programmed into multiple sectors, respective boot flags of the multiple sectors are set. The setting of the boot flag indicates that boot data is stored in this sector.

Next, a migration flowchart of boot data is described with reference to FIG. 4. In detail, when the read command and address of the boot data are received from the host system via the input/output circuit 120, the controller 150 controls the reading of the boot data from a source sector based on the received command. In another aspect, the controller 150 controls the reading of boot data from a source sector when the flash memory is powered on (S200).

The row selection circuit 160 and the column selection circuit 180 select the source sector for reading the boot data and the memory cell therein based on the address from the address register 140. For example, upon receiving a read command, the controller 150 reads the address stored in the ROM and provides the address to the address register 140. Furthermore, in a situation where the address storing the boot data is changed, the controller 150 reads the changed address by referring to a lookup table, and provides the changed address to the address register 140. However, in a situation where the position for storing boot data is predetermined, it is not necessarily required to receive an address for reading the boot data from the host system.

Next, the ECC circuit 130 performs error detection/correction based on the boot data read from the primary region and the parity data read from the spare region of the source sector. In general, the controller 150 determines whether the error bits of the boot data of the source sector have been corrected (abbreviated as bit correction) by the ECC circuit 130 (S210). In the present embodiment, the presence or absence of bit correction is determined on a sector-by-sector basis.

When the controller 150 determines that the boot data of the source sector has undergone bit correction, the ECC flag in the source sector is set (i.e., the ECC flag is programmed into data "0") (S220). Having undergone error correction can be a failure sign of this sector, therefore by setting the ECC flag, it can indicate (inform) the possibility of failure (e.g., degradation of retention characteristics) of the sector.

Therefore, when an error correction is happened in the reading of the boot data, the controller 150 migrates the boot data to a high-reliability sector that is different from the source sector having the set ECC flag, thereby suppressing errors in the boot data which will be used for controlling the operations of the flash memory 100. The migration of boot data may be performed at any time after reading the boot data from the sector. For example, the boot data may migrate to another sector after the read boot data is output to the host system, or when a subsequent programming command from the host system is input.

In some embodiments, the controller 150 selects another sector without the set ECC flag (hereafter also called "new sector" or "migration target sector") in the same column as the source sector where error correction occurred. If there are multiple sectors without the set ECC flag, a predetermined algorithm, such as prioritizing the sector with a lower row address, can be adopted to select the new sector.

In some embodiments, the controller 150 can use the same address as the address used for reading the boot data in the source sector where error correction occurred, to program the boot data to the new sector in the same column, thereby migrating the boot data to the new sector. Furthermore, when migrating the boot data, the controller 150 sets the boot flag of the migration target sector (S230).

In some embodiments, the controller 150 registers the positional relationship between the source sector and the migration target sector into a lookup table. When reading the boot data, the controller 150 refers to the lookup table and converts the address from the host system or the address read from ROM into the address corresponding to the migration target sector.

In some embodiments, the boot data stored in the source sector where error correction occurred can be preserved as a backup. In this case, the boot flag of the source sector remains set. When preserving the boot data in the source sector for backup, the controller 150 selects a sector where both the ECC flag and the boot flag are not set as the migration target sector. A sector having both the set ECC flag and the set boot flag indicates that it stores the original (i.e., pre-error correction) boot data.

In addition, the boot data sometimes needs to be updated. As shown in another boot data migration flowchart as shown in FIG. 5, when the controller 150 receives the boot data update command, the boot data for update, and the address according to requirements from the host system (S300), it selects a new sector for replacement (S310), programs the boot data for update to the selected new sector, and sets the boot flag of the selected new sector (S320). In this embodiment, the selection method of the new sector may be referred as shown in FIG. 4.

When the boot data for update is programmed into the new sector, the boot data before the update may still be retained in the source sector. In this case, the boot flag of the source sector is in a set state, and the ECC flag of the source sector is in a reset state. The positional relationship between the source sector storing the boot data before the update and the new sector storing the boot data for update may be, for example, recorded in a lookup table. Alternatively, information indicating that the version of the boot data is an old version may be programmed in the spare region of the source sector that stores the boot data before the update. When reading the boot data, the controller 150 may refer to the lookup table to convert the address from the host system or the address read from the ROM to read the boot data for update, or to read the boot data before the update. However, if the boot data before the update is not needed, the source sector may also be erased. In addition, when the source sector is determined to be erased after receiving the boot data update command, the controller will judge that if the source sector stores the main data other than the boot data, and then migrate the main data to the new sector before erasing the source sector.

Next, taking sectors arranged in 5 rows×4 columns as an example, the wear leveling method of the flash memory in this embodiment is specifically demonstrated. FIG. 6A shows the sectors in the initial state (i.e., fresh sectors).

As shown in FIG. 6B, for example, boot data is programmed into the boot region B of four fresh sectors (row 0: columns 0, 1, 2, and 3). The address for programming boot data may be provided by the host system or predetermined within the flash memory 100. The boot data is programmed into one or more rows of each sector (row 0: columns 0 to 3), and simultaneously, the boot flag of each sector (row 0: columns 0, 1, 2, and 3) is set. In addition, in this example, set is represented by "1" and reset is represented by "0".

FIG. 6C shows an example in which bit correction occurs in the boot data read from the sector (row 0: column 1). In this case, as shown in FIG. 6D, the corrected boot data read from the source sector (row 0: column 1) is, for example, migrated to the new sector (row 4: column 1) on the same column of the substitute region R.

A sector on the same column whose ECC flag and boot flag have been reset is selected as a new sector for substitution. If there are multiple sector candidates whose ECC flags and boot flags have been reset, one sector is selected according to an arbitrary algorithm. For example, a common algorithm is to choose the sector with the earliest row address, ensuring that the sector with the furthest and slowest programming sequence is selected. In the example figure, the sector (row 4: column 1) is illustrated as the new sector for substitution.

Furthermore, in some embodiments, the migration target sector of boot data is selected from a sector that has not been used by the user (i.e., a sector that has not been programmed with data from the user). Whether the sector is used by the user may be judging, for example, by determining the presence of parity data related to the main data in the spare region, or by setting a flag in the spare region indicating whether the sector is in use by the user.

When the boot data is migrated, the address relationship between the source sector (row 0: column 1) and the migration target sector (row 4: column 1) is, for example, registered in a lookup table (LUT). Furthermore, the ECC flag of the source sector (row 0: column 1) is set to "1" to indicate the source sector (row 0: column 1) has the possibility of failure. If the boot flag of the source sector (row 0: column 1) is still "1", then the two flags of the sector (row 0: column 1) are "11", this code combination indicates that the source sector (row 0: column 1) stores the boot data before correction and migration.

FIG. 6E shows an example of migrating the boot data for update to a new sector when a boot data update command is received. For example, when the boot data stored in the source sector (row 0: column 1) is the target to be updated according to a boot data update command, the same algorithm for selecting a new sector as shown in FIG. 6D is used. A new sector with a reset ECC flag on the same column as the source sector is selected, then boot data for update is programmed to the selected new sector, and the boot flag of the new sector is set to "1". The address relationship between the source sector (row 0: column 1) storing the boot data before the update and the new sector (row 4: column 1) storing the boot data for update is, for example, registered in a lookup table (LUT). It is worth noting that the ECC flag of the source sector storing the pre-update boot data (row 0: column 1) remains reset ("0").

FIG. 6F shows reading of the boot data after it has been migrated. When a read operation for boot data is performed, the controller 150 refers to the lookup table to convert the address for reading, and reads the boot data stored in the sector (row 0: column 0), sector (row 4: column 1), sector (row 0: column 2), sector (row 0: column 3) based on the converted address.

FIG. 7A shows a state in which the ECC flags of all other sectors on the same column, except for a source sector storing boot data, are set. In the first source sector (row 1: column 1) where the boot data is stored, the ECC flag is reset, while the ECC flags of all other sectors in column 1 are set.

In this case, in order to prepare a first new sector for migrating the boot data, as shown in FIG. 7B, the controller 150 erases the oldest sector (row 0: column 1) on the same column that initially stored boot data to reset the ECC flag and the boot flag thereof. The deterioration of memory cells may improve over time. By assigning the oldest sectors as the next substitution sectors, the occurrence of errors in boot data is minimized, thereby maintaining the reliability of boot data over time.

If the controller 150 judges that the erase target sector (row 0: column 1) also stores main data, as shown in FIG. 7B1, the main data is first migrated to another sector on the same column (row 4: column 1), and then the erase target sector (row 0: column 1) is erased. The address relationship between the erase target sector and another sector related to the migration of main data is, for example, registered in a lookup table, and the controller 150 refers to the lookup table to convert the addresses when reading the main data. After the main data is migrated, the erase target sector (row 0: column 1) is erased, that is, the ECC flag and the boot flag are reset.

FIG. 7C shows an example where bit correction occurs when reading the boot data of the first source sector (row 1: column 1). In this case, the controller 150 sets the ECC flag of the first source sector (row 1: column 1) to "1", and then migrates the boot data to the first new sector (row 0: column 1), and simultaneously sets the boot flag of the first new sector (row 0: column 1) to "1".

Since the ECC flags of all the remaining sectors on column 1 are all "1" again, as shown in FIG. 7D, the furthest sector (row 4: column 1) on column 1 is erased to reset the ECC flag and boot flag thereof to "0". In the case where main data is stored in the sector (row 4: column 1), the sector (row 4: column 1) may be erased after migrating the main data to another sector on the same column.

Subsequently, when a bit correction occurs in the reading of the second source sector (row 0: column 1), as shown in FIG. 7E, the ECC flag of the second source sector (row 0: column 1) is set to "1". Therefore, the controller 150 migrates the boot data in the second source sector (row 0: column 1) to the second new sector (row 4: column 1) on the same column, and simultaneously sets the boot flag of the second new sector (row 4: column 1) to "1".

According to this embodiment, when bit correction occurs in the reading of the boot data, the boot data is migrated to a new sector without the set ECC flag. This approach minimizes errors in the boot data and improves its reliability. Similarly, when updates occur in the boot data, the boot data is migrated to a new sector without the set ECC flag. Therefore, the boot data may be protected to minimize errors in the boot data and improve its reliability. Furthermore, by moving boot data according to a specific algorithm, the wear leveling method of the present disclosure can achieve a more equal distribution of usage frequency among sectors storing boot data. This contributes to a more balanced and efficient utilization of the sectors over time.

Figure 4:
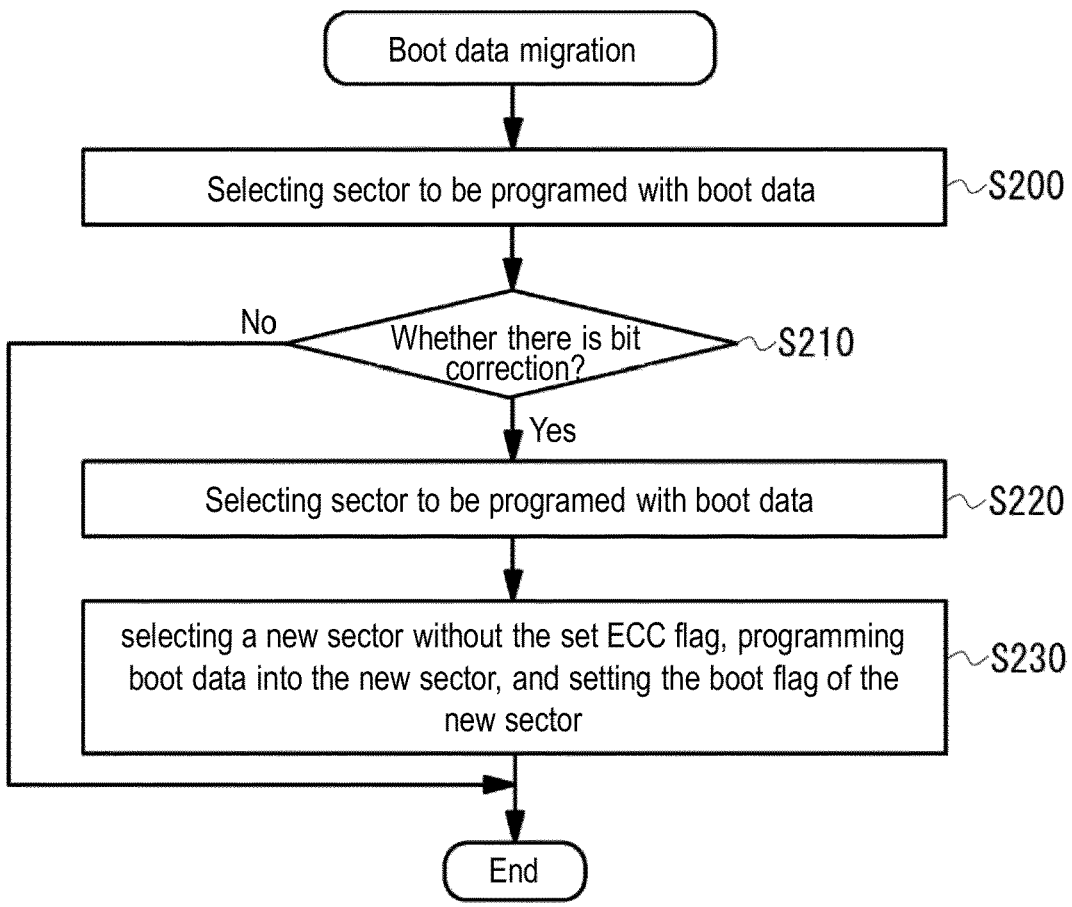
FIG. 4 is a first example of the migration flowchart of boot data according to the first embodiment of the disclosure.
Figure 5:
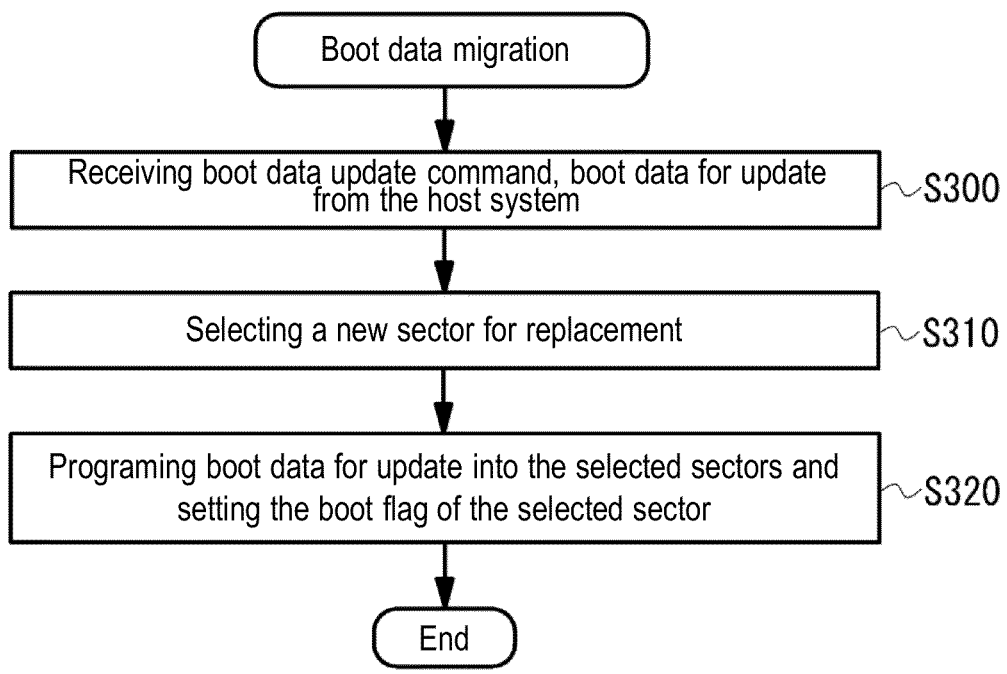
FIG. 5 is a second example of the migration flowchart of boot data according to the first embodiment of the disclosure.
Figure 8:
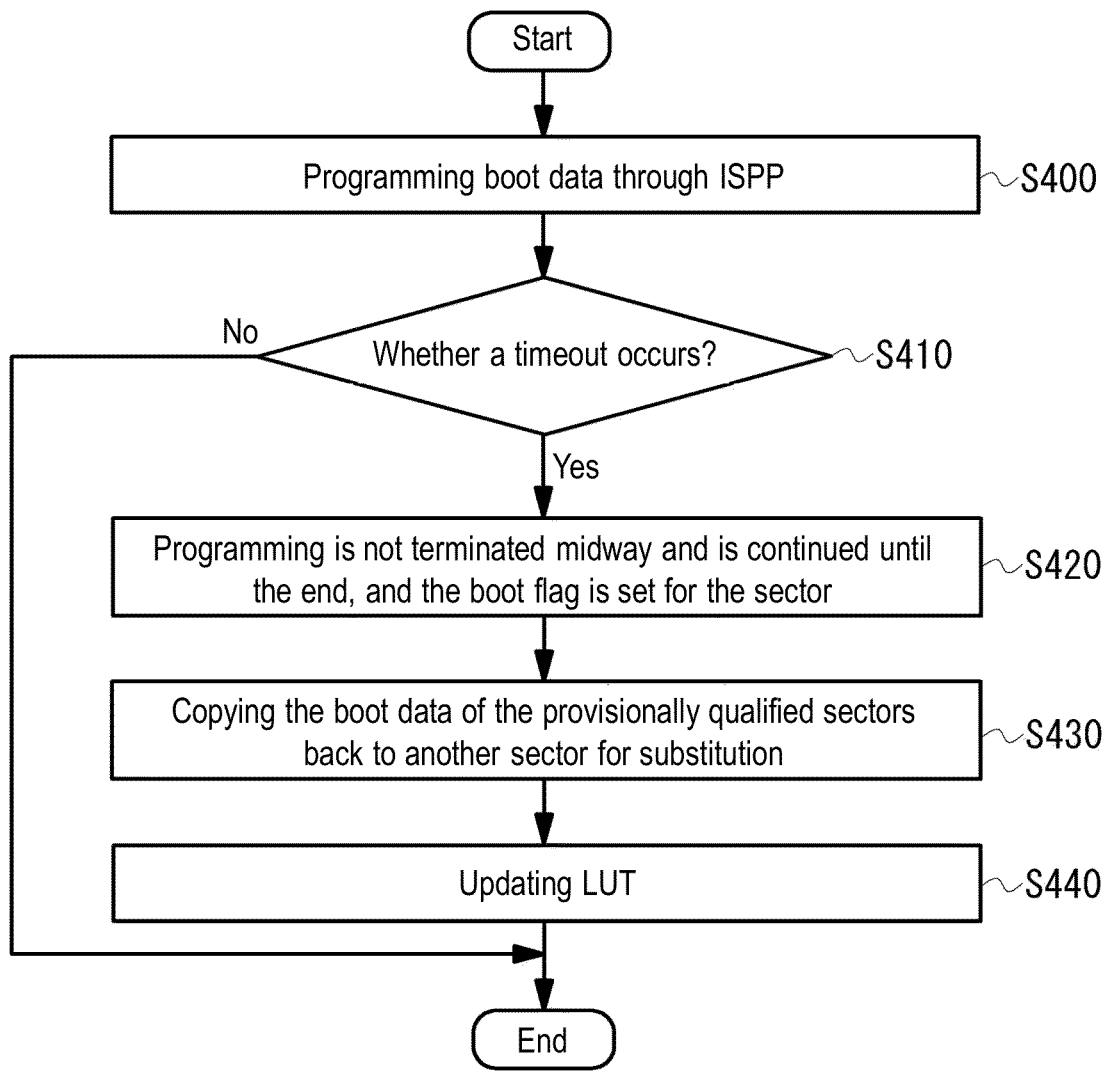
FIG. 8 is a third example of the migration flowchart of boot data according to the first embodiment of the disclosure.

The aforementioned flowchart shown in FIG. 4 shows an example of migrating the boot data when an error occurs in the boot data during the reading operation of the boot data. However, the flowchart in FIG. 8 is the migration flowchart of boot data during a writing operation.

As explained in the operation flowchart of FIG. 3, the controller 150 programs the boot data received via the input/output circuit 120 into the selected sector (S400). Programming is carried out by applying programming pulses to the selected memory cells using the incremental step pulse program (ISPP) method. If the programming verification fails, a programming pulse with a voltage one level higher than the previous one is applied.

When the number of times or the duration of the application of programming pulses has reached a certain limit and a timeout has occurred (S410), the controller 150 does not prematurely terminate the programming operation. Instead, the controller 150 continues the program operation, completes the programming for the sector, and sets the boot flag for that sector (S420). In this case, the ECC flag remains reset. The controller 150 manages this sector as provisionally qualified.

After the boot programming is completed, the controller 150 migrates the boot data written into the sector managed as provisionally qualified to a new sector by a copy-back operation (S430). The relationship between the provisionally qualified sector and the new sector is then updated in a lookup table (S440). The new sector is in an erased state. Consequently, the boot data is written to the new sector and the boot flag of the new sector is set, but the ECC flag of the new sector remains reset.

Figure 9:
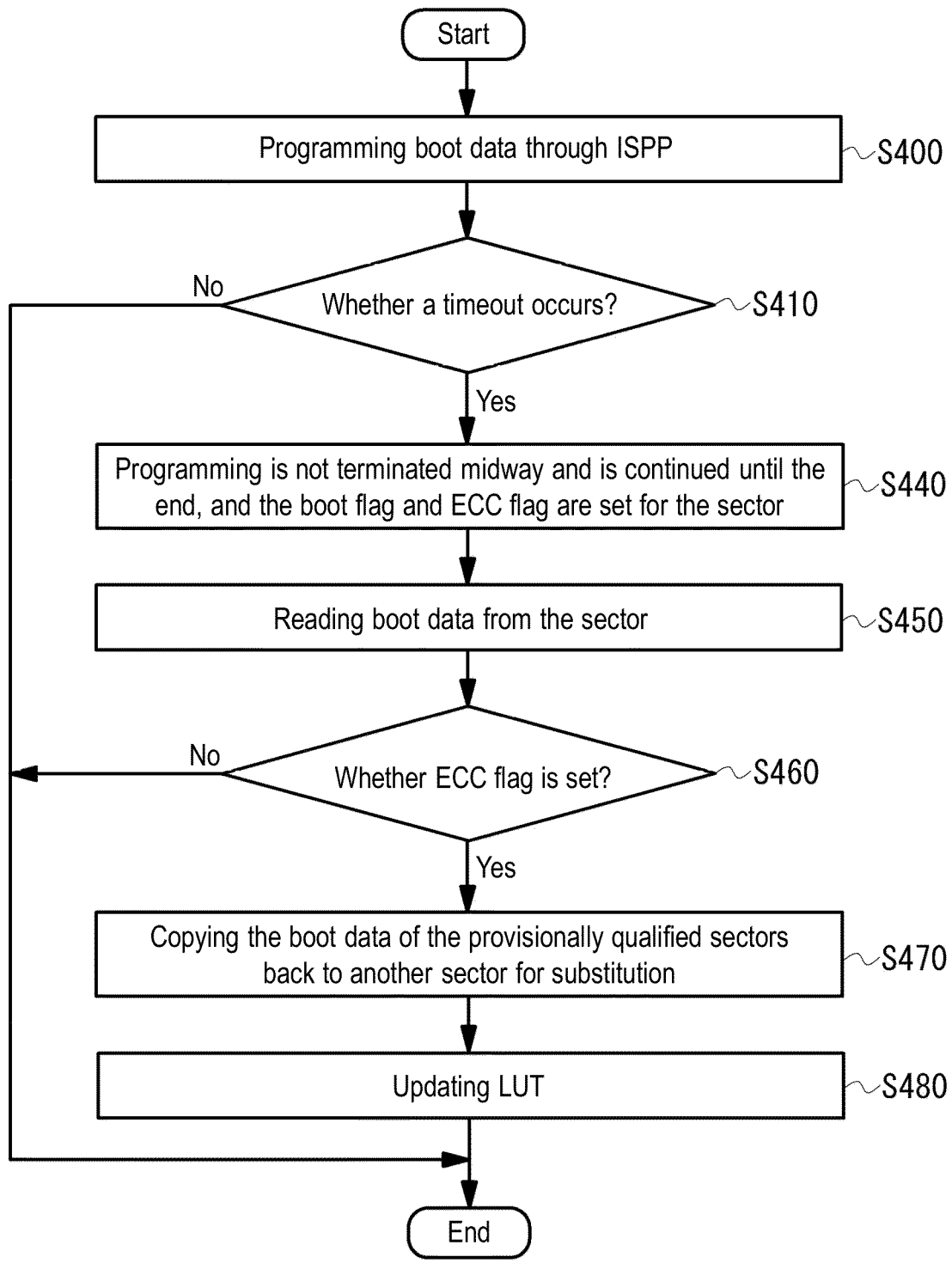
FIG. 9 is a fourth example of the migration flowchart of boot data according to the first embodiment of the disclosure.

In FIG. 9, steps S400 and S410 are the same as in FIG. 8, but when the programming of the provisionally qualified boot data ends, the controller 150 not only sets the boot flag but also sets the ECC flag (S440) of the sector managed as provisionally qualified.

Subsequently, when reading the boot data (S450), the controller 150 checks whether the ECC flag is set in the sector (S460). When the ECC flag is set, the controller 150 copies the boot data of the provisionally qualified sector back to a new sector (S470), and updates the relationship between the provisionally qualified sector and the new sector in the lookup table (S480).

The provisionally qualified sector serves as an indication of an impending failure in that sector. By performing a copy-back operation to move the boot data programmed in the provisionally qualified sector to another replacement sector, the reliability of the boot data can be maintained. This embodiment helps safeguard against potential issues and ensures the continued dependability of the boot data.

Figure 10:
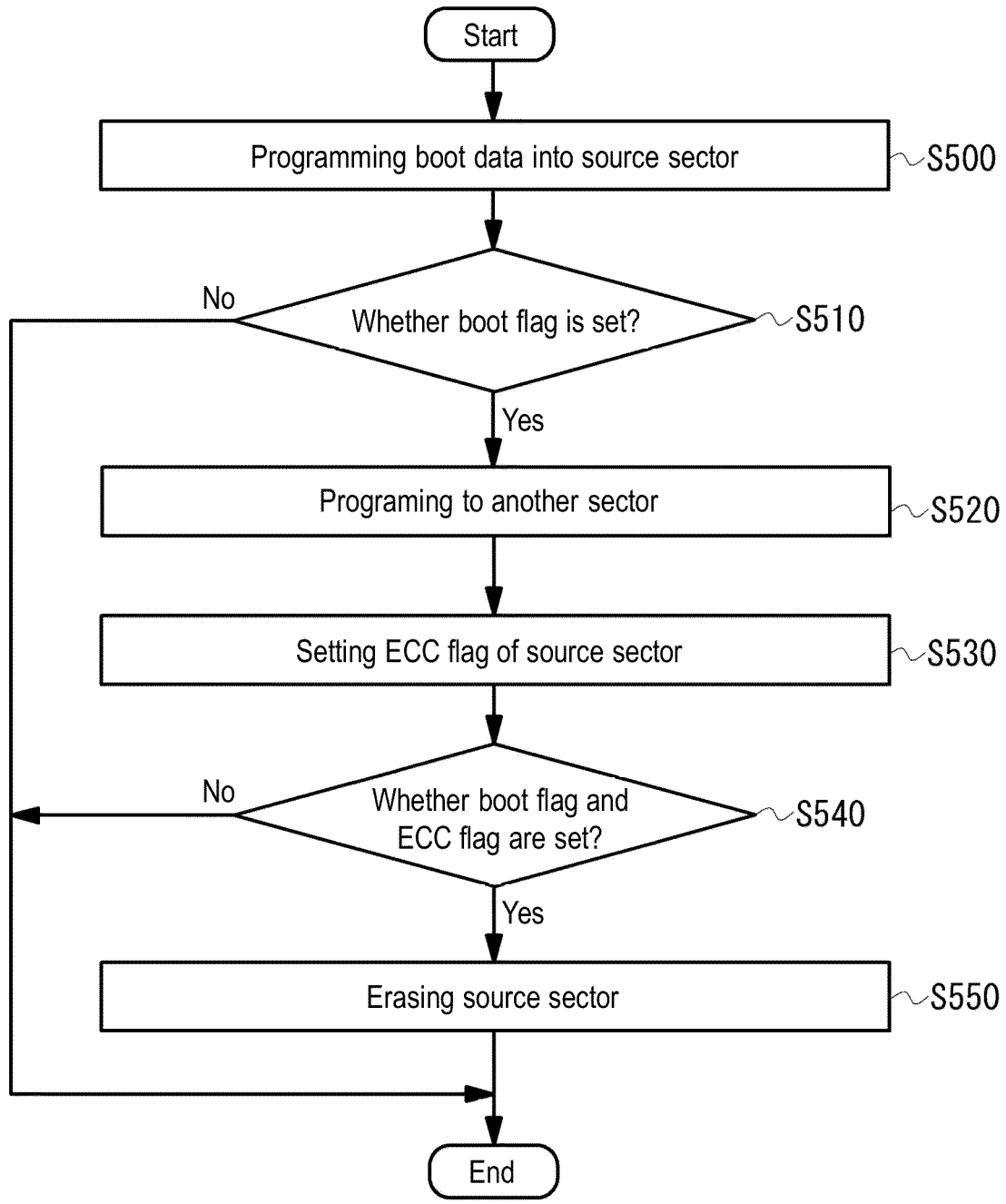
FIG. 10 is a fifth example of the migration flowchart of boot data according to the first embodiment of the disclosure.

Next, the flowchart of FIG. 10 shows an example of using the boot flag for a write protect operation. When the controller 150 performs boot programming of a sector (S500), if it determines that the boot flag of a source sector has been set (S510), the controller 150 cancels the programming of the source sector and programs the boot data to a new sector (e.g., another sector for substitution) (S520). Therefore, the boot flag of the new sector is set.

After programming the boot data of the new sector, the controller 150 sets the ECC flag of the source sector in order to erase the old boot data thereof (S530). In detail, the controller 150 checks the setting state of the boot flag and ECC flag of the source sector, if the boot flag and ECC flag are set in the source sector (S540), the source sector is erased (S550).

Next, a second embodiment of the disclosure is described. The second embodiment is related to the algorithms for selecting the migration target sector when the bit correction occurs, and includes a mode A sector selection algorithm used during initial operation and a mode B sector selection algorithm used during aging. The mode B sector selection algorithm is designed to prevent sectors with a high frequency of ECC errors from being selected as the new sectors. In the second embodiment, in order to select from the mode A and B sector selection algorithms, an EX flag (or referred to as the third flag) is adopted.

In this embodiment, as shown in FIG. 11A, each sector includes an ECC flag, a boot flag, and an EX flag in a set or reset state.

FIG. 11B shows a memory cell array in which m sectors are arranged along the column direction and n sectors are arranged along the row direction. If one sector is 2048 bytes, a row including m sectors has the storage capacity shown in FIG. 11C.

The mode A sector selection algorithm is described as follows. 1. As shown by arrow P1, for selecting the migration target sector when the bit correction occurs, when the ECC flag and boot flag of a sector of a row is determined as set, the sector number is incremented so that it increases toward the right (first priority). 2. As shown by arrow P2, when the final number of the sector on the same row is reached (that is, when sector number=m), the row number is incremented so that it increases downward (second priority). In some embodiments, the controller 150 includes a counter that retains the sector number and row number, and increments the value of the counter to select or identify sectors and rows of the new sector.

The mode B sector selection algorithm prevents sectors from being selected for substitution by, for example, setting the EX flag to a set state (i.e., logic "1"). That is, sectors having an EX flag in a set state, indicating a high frequency of ECC errors, are prone to failure. In some embodiments, the controller 150 counts the number of ECC errors (error correction) for each sector, and when the count value reaches a certain level, the EX flag is set to a set state. Furthermore, in another aspect, when the controller 150 receives a command for setting the EX flag from the host system, the EX flag is set accordingly.

Moreover, in this embodiment, the mode A and B sector selection algorithms may be enabled/disabled through register settings. For example, mode A is enabled and mode B is disabled, or mode A is disabled and mode B is enabled, or both modes A and B are enabled. For example, the register settings may be changed by inputting a command for writing to a register from the host system.

Figure 12B:
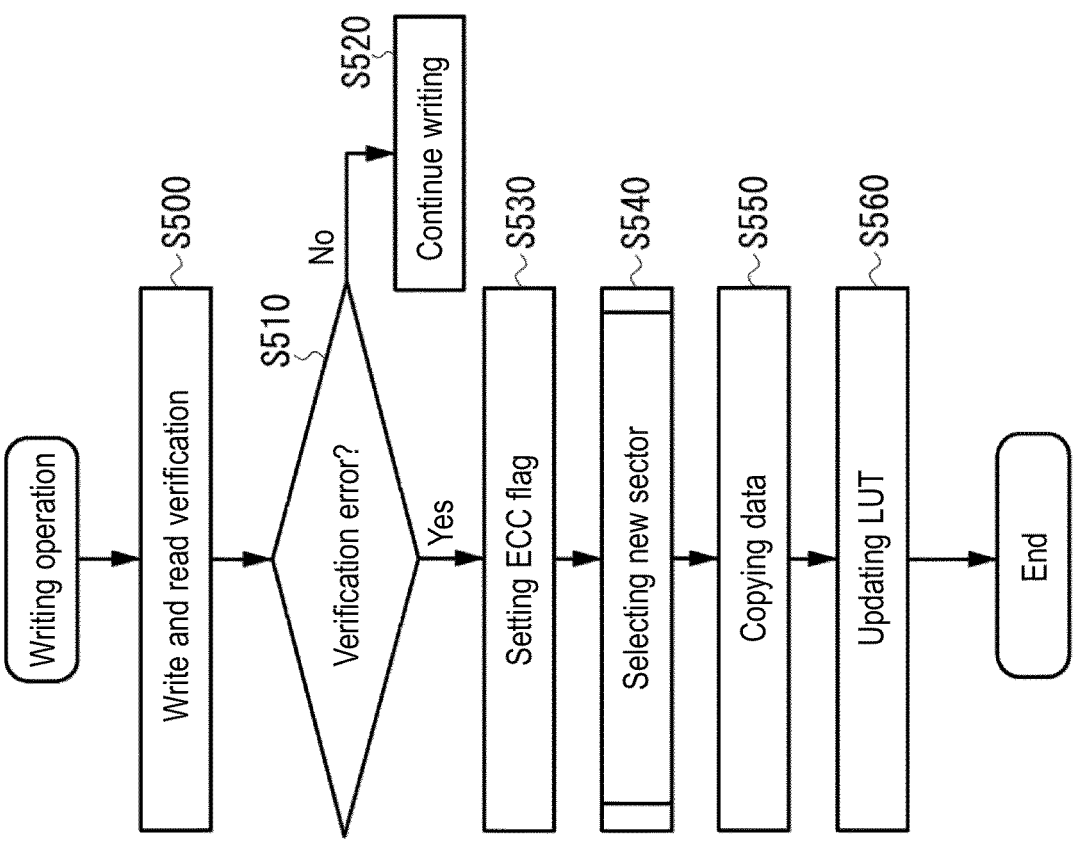
FIG. 12A and FIG. 12B are flowcharts respectively showing the reading and writing operations of the second embodiment of the disclosure.

Next, the reading operation and writing operation of the second embodiment are described with reference to FIG. 12A and FIG. 12B. In this embodiment, the mode A and B sector selection algorithms are enabled through register settings. The difference between the second embodiment and the first embodiment is, the second embodiment selects a new sector according to the mode A and B sector selection algorithms (S440, S540).

Figure 12A:
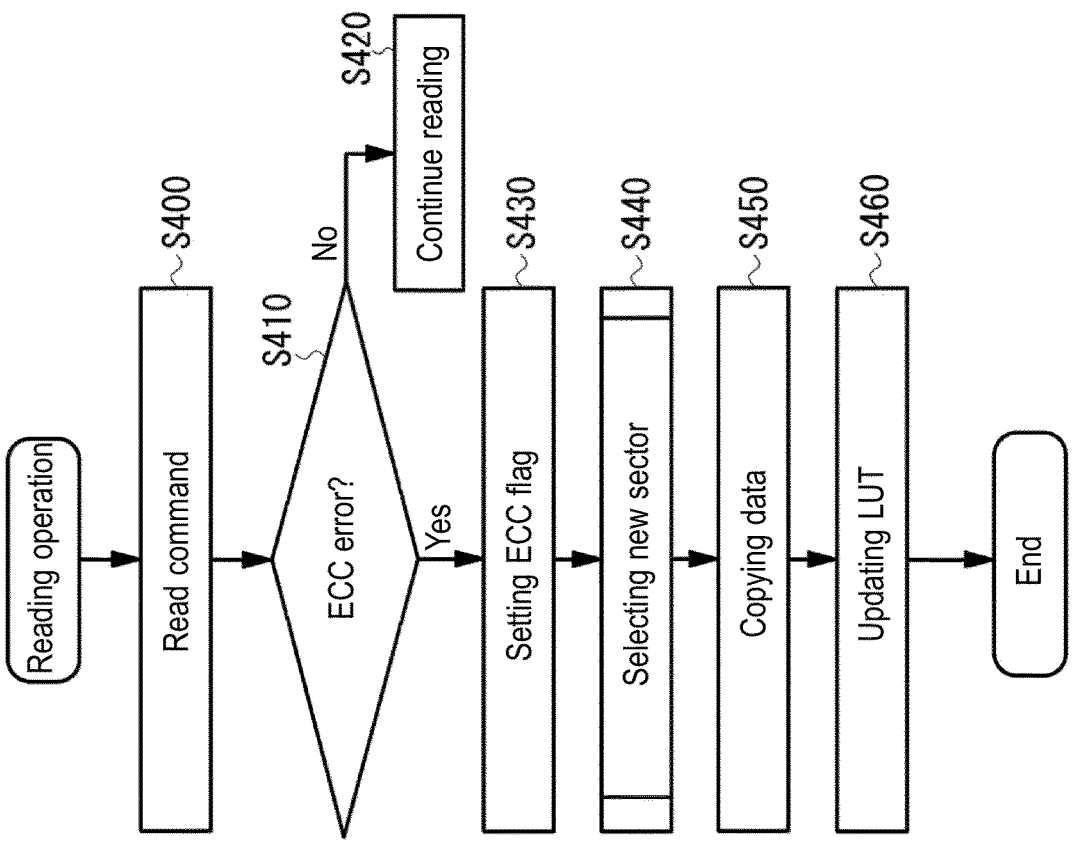

As shown in FIG. 12A, during the reading operation, when receiving a read command from the host system (S400), the controller 150 starts the reading operation and determines whether an error is detected in the data read from the selected memory cell by the ECC circuit 130 (S410, simplified as "ECC error"). If no ECC error is detected, continue reading (S420). On the other hand, if an ECC error is detected, the controller 150 sets an ECC flag to the sector (S430), and then selects a new sector as the migration target (S440), copies the corrected data of the source sector to the selected new sector (S450), and updates the relationship between the source sector and the migration target sector in the LUT (S460).

In the writing operation, when receiving the write command from the host system (S500), the controller 150 starts the writing operation based on ISPP and determines whether a verification error has occurred (S510). The verification error is, for example, a timeout detected as shown in FIG. 8. If no verification error has occurred, continue writing (S520). On the other hand, if a verification error has occurred, the controller 150 sets an ECC flag to the sector having the verification error as the source sector (S530), and then selects a new sector as the migration target (S540), copies the data of the source sector to the selected new sector (S550), and updates the relationship between the source sector and the migration target sector in the LUT (S560).

Next, selecting the new sector based on the mode A and B sector selection algorithms in steps S440 and S540 are described with reference to the flowchart of FIG. 13A and FIG. 13B.

Figure 13A:
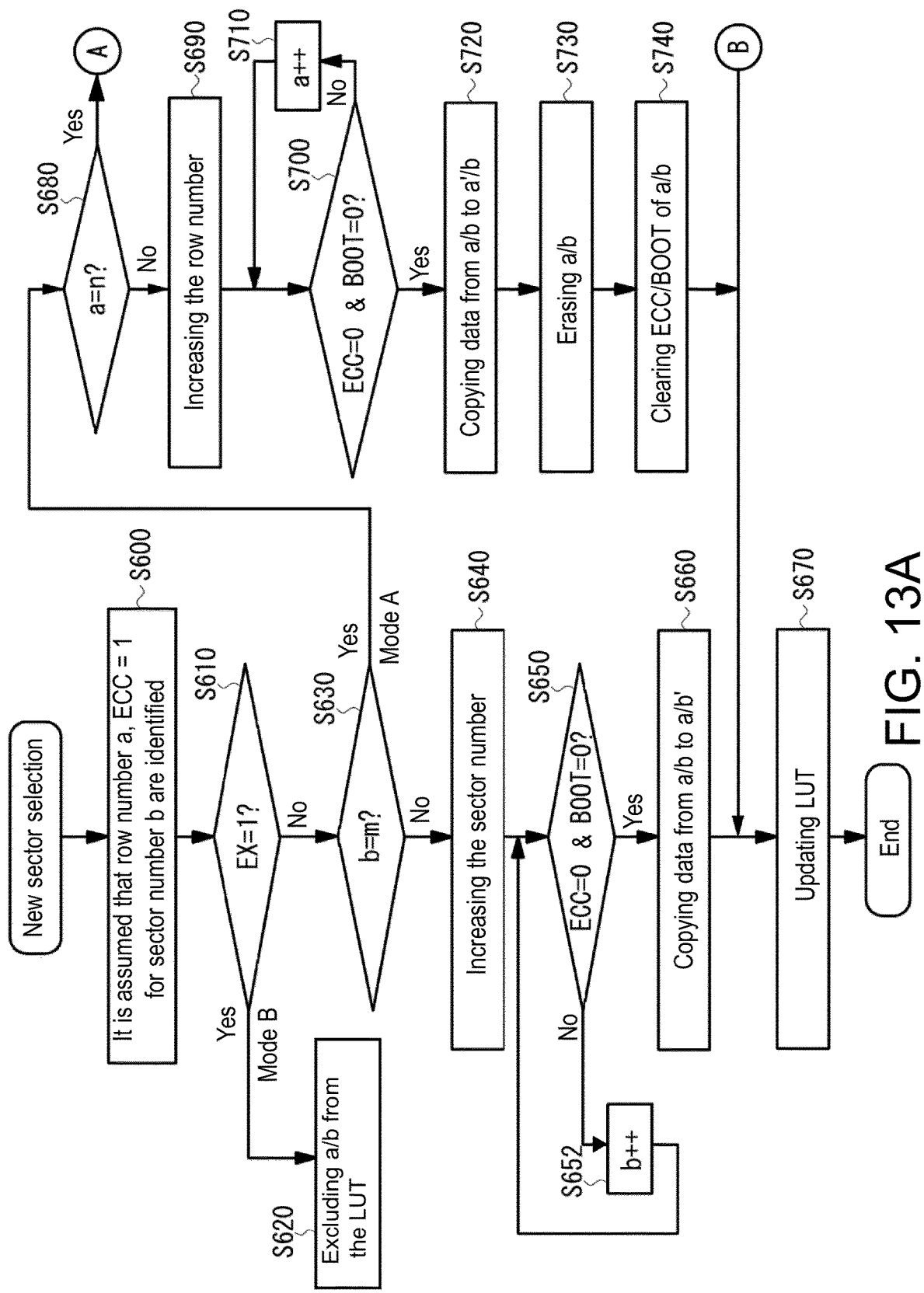
FIG. 13A and FIG. 13B are flowcharts showing a selection operation of a new sector of a migration target of the second embodiment of the disclosure.

In FIG. 13A, it is assumed that the controller 150 identifies row number a and ECC flag=1 (set state) for sector number b (S600). The controller 150 determines whether the EX flag of row number a and sector number b is 1 (set state) (S610), and selects the mode A or B sector selection algorithm accordingly. When the EX flag=1 is detected, according to the mode B sector selection algorithm, the controller 150 determines that the frequency of ECC errors in the sector is high, and excludes sector b of row number a from the LUT (S620) to prevent it from being selected as the migration target sector.

If the EX flag≠1, the controller 150 determines whether the sector number b is equal to the final number m (S630) according to the first priority of the mode A sector selection algorithm. If b≠m, the controller 150 increments the sector number b (S640). Here, the incremented sector number is b' (=b+1). The controller 150 determines whether the ECC flag of the incremented sector number b'=0 and the boot flag=0 (S650), if not, the sector number is incremented again (S652, b++ is, for example, b'+1) and the controller 150 returns to step S650, until a sector with an ECC flag=0 and a boot flag=0 is selected (i.e., the selection of the new sector for the migration target is determined).

When the selection of the new sector is determined, the controller 150 copies the data of the source sector with the sector number b of the row number a to the new sector with the selected sector number b' of the row number a (S660). The timing of data copying is not particularly limited. For example, it may be after reading/writing is completed, or during the next reading/writing operation, or during standby. After the data of the source sector is copied to the new sector, the LUT is updated (S670).

On the other hand, in step S630, if the sector number b is equal to the final number m, the controller 150 determines whether the row number a is equal to the final number n (S680) according to the second priority of the mode A sector selection algorithm. If a≠n, the controller 150 increments the row number (S690). Here, the incremented row number a'=a+1. In this case, sector number b may be changed to the starting sector number 0. Next, the controller 150 determines whether the ECC flag of the incremented sector number b in the row number a'=0 and the boot flag=0 (S700), if not, the row number is incremented again (S710, a++ is, for example, a'+1) and the controller 150 returns to step S700, until a sector with an ECC flag=0 and a boot flag=0 is selected (i.e., the selection of the new sector for the migration target is determined).

When the selection of the new sector is determined, the controller 150 copies the data of the source sector with the sector number b of the row number a to the sector with the sector number 0 of the selected row number a' (S720). Next, the controller 150 erases the sector with the row number a and sector number b (S730), clears the ECC flag and boot flag of the sector (S740), and updates the LUT (S670). In this case, the data in the source sector is erased.

Figure 13B:
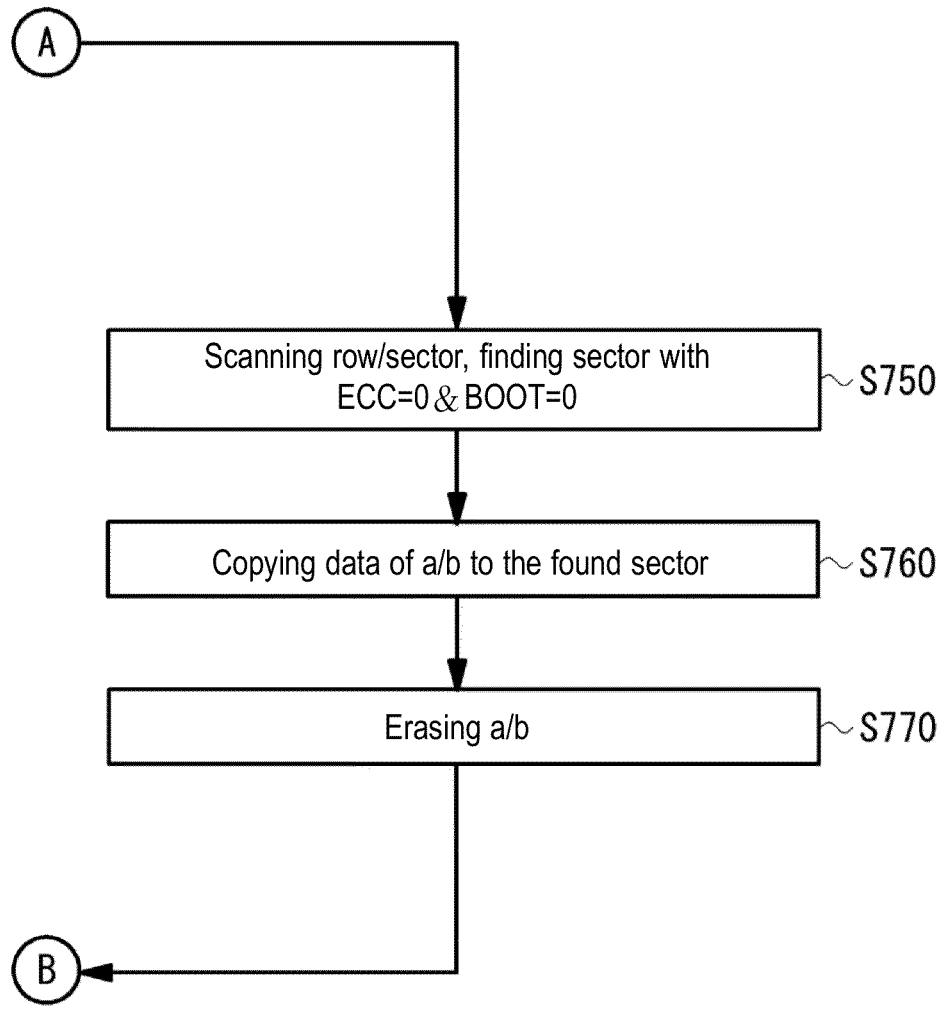

In step S680, if the row number a is equal to the final number n, as shown in FIG. 13B, the controller 150 scans the row/sector to find a new sector with ECC flag=0 and boot flag=0 (S750), then copies the data of the source sector with row number a and sector number b to the newly found sector (S760), erases the data of the source sector (S770), and updates the LUT (S670). In this case, the source data is erased.

The above example is a case where mode A and B sector selection algorithms are enabled. In other embodiments where mode B sector selection algorithm is disabled through register settings, steps S610 and S620 are not implemented. Furthermore, in other embodiments where mode A sector selection algorithm is disabled, steps S630 to S770 are not implemented. In this case, a new sector for substitution may be selected as in the first embodiment.

In addition, the flowchart of FIG. 13A and FIG. 13B shows an example of processing for implementing mode A and B sector selection algorithms. The mode A and B sector selection algorithms may also be implemented by other processing or steps. In addition, although the above content describes the first embodiment and the second embodiment separately, the first embodiment and the second embodiment may also be combined and changed without departing from the scope of the disclosure.

In the above-mentioned embodiment, a NOR flash memory is exemplified, but the disclosure may also be applied to a NAND flash memory. For example, in NAND flash memory, each block may respectively have a region to store an ECC flag and a boot flag. The setting of the ECC flag indicates that a bit correction has occurred during the reading of boot data from the block. The setting of the boot flag indicates that boot data is stored in the block.

In the above-mentioned embodiment, the data to be protected stored in the memory cell array is boot data (boot code). However, the data to be protected is not limited to the boot data, and may also be other specific data that should be protected equally with the boot data. That is, the boot flag is a flag configured to indicate whether specific data is stored.

In the above embodiment, an example is shown in which the ECC flag and the boot flag are stored in the spare region. However, the ECC flag and the boot flag may also be stored in any region of a sector or block. Moreover, the size of the sector or block storing the ECC flag and the boot flag is not particularly limited.

Furthermore, the flash memory of the present disclosure may be used on electric vehicles or automotive electronics, such as Advanced Driver Assistance Systems (ADAS), Instrument Clusters, Infotainment. The flash memory of the present disclosure may be used on space constrained applications including Wearable, MP3 players, smart watches, games, digital radio, toys, cameras, digital photo album, GPS, Bluetooth and WiFi modules. The flash memory of the present disclosure may be used on IoT and mobile electronic devices.

Besides, since reliability and endurance of the flash memory of the present invention are improved, the present invention provides a sustainable flash memory.

The preferred embodiments of the disclosure have been described in detail above, but the disclosure is not limited the specific embodiments, and various modifications and changes may be made without departing from the scope of the disclosure.

What is claimed is:

1. A wear leveling method of a flash memory, wherein a memory cell array of the flash memory has a plurality of sectors, and the method comprises:
    setting a region configured for storing a first flag and a second flag in each of the sectors, wherein the first flag is configured to indicate whether bit correction has occurred, the second flag is configured to indicate whether specific data is stored;
    setting the second flag of a source sector among the sectors in which the specific data is stored; and
    writing the specific data to a new sector among the sectors in which the first flag is in a reset state, and setting the second flag of the new sector.

2. The wear leveling method of the flash memory according to claim 1, further comprising:
    setting the first flag of the source sector when the bit correction has occurred during reading of the specific data from the source sector, to write the read specific data to the new sector.

3. The wear leveling method of the flash memory according to claim 1, further comprising:
    updating the specific data in the source sector,
    wherein writing the specific data to the new sector in which the first flag is in the reset state among the sectors comprises writing specific data for update to the new sector.

4. The wear leveling method of the flash memory according to claim 1, wherein the second flag of the new sector is in the reset state.

5. The wear leveling method of the flash memory according to claim 2, wherein the new sector is located in a same column as the source sector.

6. The wear leveling method of the flash memory according to claim 1, further comprising:
    selecting one of the sectors in which the first flag is in the reset state as the new sector according to a predetermined algorithm.

7. The wear leveling method of the flash memory according to claim 1, further comprising: erasing the new sector according to a predetermined algorithm before writing the specific data to the new sector in which the first flag is in the reset state among the sectors when the first flag of other sectors on a same column as the source sector has been set.

8. The wear leveling method of the flash memory according to claim 7, wherein the new sector is a starting sector in the same column as the source sector.

9. The wear leveling method of the flash memory according to claim 1, wherein the specific data is boot data.

10. The wear leveling method of the flash memory according to claim 1, wherein each of the sectors further comprises a third flag configured for selecting a first algorithm or a second algorithm, wherein
    the first algorithm is configured to exclude selection of the new sector from sectors with a high bit correction frequency, the second algorithm is configured to enable selection of the new sector from sectors with a low bit correction frequency,
    the first algorithm is selected when the third flag is one of a set state and the reset state, the second algorithm is selected when the third flag is another one of the set state and the reset state.

11. A flash memory, comprising:
    a memory cell array, comprising a plurality of sectors, wherein a region configured for storing a first flag and a second flag is set in each of the sectors, the first flag is configured to indicate whether bit correction has occurred, the second flag is configured to indicate whether specific data is stored; and
    a controller, configured to set the second flag of a source sector among the sectors in which the specific data is stored, write the specific data to a new sector among the sectors in which the first flag is in a reset state, and set the second flag of the new sector.

12. The flash memory according to claim 11, wherein the controller is further configured to set the first flag of the source sector when the bit correction has occurred during reading of the specific data from the source sector, to write the read specific data to the new sector.

13. The flash memory according to claim 11, wherein the controller is further configured to update the specific data in the source sector, and write specific data for update to the new sector.

14. The flash memory according to claim 11, wherein the second flag of the new sector is in the reset state.

15. The flash memory according to claim 12, wherein the new sector is located in a same column as the source sector.

16. The flash memory according to claim 11, wherein the controller is further configured to select one of the sectors in which the first flag is in the reset state as the new sector according to a predetermined algorithm.

17. The flash memory according to claim 11, wherein the controller is further configured to erase the new sector according to a predetermined algorithm before writing the specific data to the new sector when the first flag of other sectors on a same column as the source sector has been set.

18. The flash memory according to claim 17, wherein the new sector is a starting sector in the same column as the source sector, and the specific data is boot data.

19. The flash memory according to claim 11, wherein each of the sectors further comprises a third flag configured for selecting a first algorithm or a second algorithm, wherein
the first algorithm is configured to exclude selection of the new sector from sectors with a high bit correction frequency, the second algorithm is configured to enable selection of the new sector from sectors with a low bit correction frequency,
the controller is further configured to select the first algorithm when the third flag is one of a set state and the reset state, select the second algorithm when the third flag is another one of the set state and the reset state.

20. The flash memory according to claim 19, further comprising a register configured for storing information for enabling or disabling the first algorithm and the second algorithm, wherein the controller selectively enables or disables the first algorithm and the second algorithm through the information in the register.

* * * * *